United States Patent
Kasper et al.

[11] Patent Number: 5,177,780
[45] Date of Patent: Jan. 5, 1993

[54] METHOD OF VOICE MAIL NOTIFICATION FOR CELLULAR TELEPHONE SYSTEMS

[75] Inventors: Gordon R. Kasper, Deerfield; Patricia A. Kizior, Downers Grove, both of Ill.

[73] Assignee: AT&T Bell Laboratories, Murray Hill, N.J.

[21] Appl. No.: 599,572

[22] Filed: Oct. 18, 1990

[51] Int. Cl.⁵ .................. H04M 11/00; H04M 1/64; H04M 3/42

[52] U.S. Cl. .................................. 379/59; 379/58; 379/63; 379/88; 379/89; 379/201

[58] Field of Search ............... 379/59, 63, 201, 67, 379/88, 89, 58

[56] References Cited

U.S. PATENT DOCUMENTS 4,221,933  9/1980  Cornell et al. ............... 379/89
4,893,335  1/1990  Fuller et al. ................. 379/201
4,964,156  10/1990 Blair ........................... 379/63

*Primary Examiner*—James L. Dwyer
*Assistant Examiner*—Harry S. Hong
*Attorney, Agent, or Firm*—A. G. Steinmetz

[57] ABSTRACT

A voice mail notification arrangement provides an audible notification to a mobile radiotelephone subscriber that one or more incoming calls have been redirected to the subscriber's mailbox.

An unanswered incoming call is directed to the voice mail system which stores the calling party's voice message. A flag is set in a feature data base which includes this feature for the called subscriber. When the subscriber subsequently originates a call from their cellular mobile radiotelephone, or answers any incoming call, an audible notification (e.g., a burst of special tone) is provided, via the speaker of the mobile radiotelephone handset, to alert the subscriber at the outset of an active call that there are one or more voice messages in his/her voice mailbox. The flag is cleared when the voice messages are retrieved or upon the first call originated by the mobile subscriber, depending upon the mode of operation active in the subscriber's system.

7 Claims, 2 Drawing Sheets

METHOD OF VOICE MAIL NOTIFICATION FOR CELLULAR TELEPHONE SYSTEMS

FIELD OF THE INVENTION

This invention relates to cellular mobile radiotelephone systems and in particular to a method of providing notification to a mobile radiotelephone subscriber of waiting voice mail messages.

BACKGROUND OF THE INVENTION

Voice mail is a feature of modern telephone systems that allows a calling party to leave a message for subsequent retrieval by a called party. It is normally subsequently retrieved by the called party (i.e. the intended recipient) by issuance of a command or series of commands to the telephone system that has stored the message for such later retrieval. The voice mail feature is most often used when the called party does not answer the incoming call and the incoming message is automatically redirected to the subscriber's voice mailbox.

The voice mail process involves the storage of a recorded voice message on storage equipment associated with the telephone switching network. The called party retrieves the message at a subsequent time when he/she issues a command or series of commands through his/her subscriber set to the storage equipment of the telephone network. In conventional land switched telephone networks, the called party is notified by a message waiting lamp (e.g. visual indicator light) included with the subscriber telephone set. Different notification techniques are provided with differing subscriber equipment.

Cellular mobile radiotelephones are connected, via radio, to the land public telephone network and hence voice mail messages may be directed to storage equipment associated with a mobile radiotelephone system. However a message waiting lamp is not presently available on commercially available mobile radiotelephones. The mobile subscriber must be notified of this voice mail message so that action may be taken to retrieve it, by having the stored message read out through his/her mobile radiotelephone.

SUMMARY OF THE INVENTION

A voice mail notification arrangement, embodying the principles of the invention, provides an audible notification to a mobile radiotelephone subscriber that one or more incoming calls have been redirected to the subscriber's mailbox.

In one particular embodiment an unanswered incoming call is directed to the voice mail system which stores the calling party's voice message. A flag is set in a feature data base which includes this notification option for the called subscriber. When the subscriber subsequently originates or answers any incoming call an audible notification (e.g. a burst of special tone) is provided to alert the subscriber at the outset of an active call that there are one or more newly received voice messages in his/her voice mailbox. The flag is cleared when the new voice messages are retrieved.

DETAILED DESCRIPTION

Figure 1:
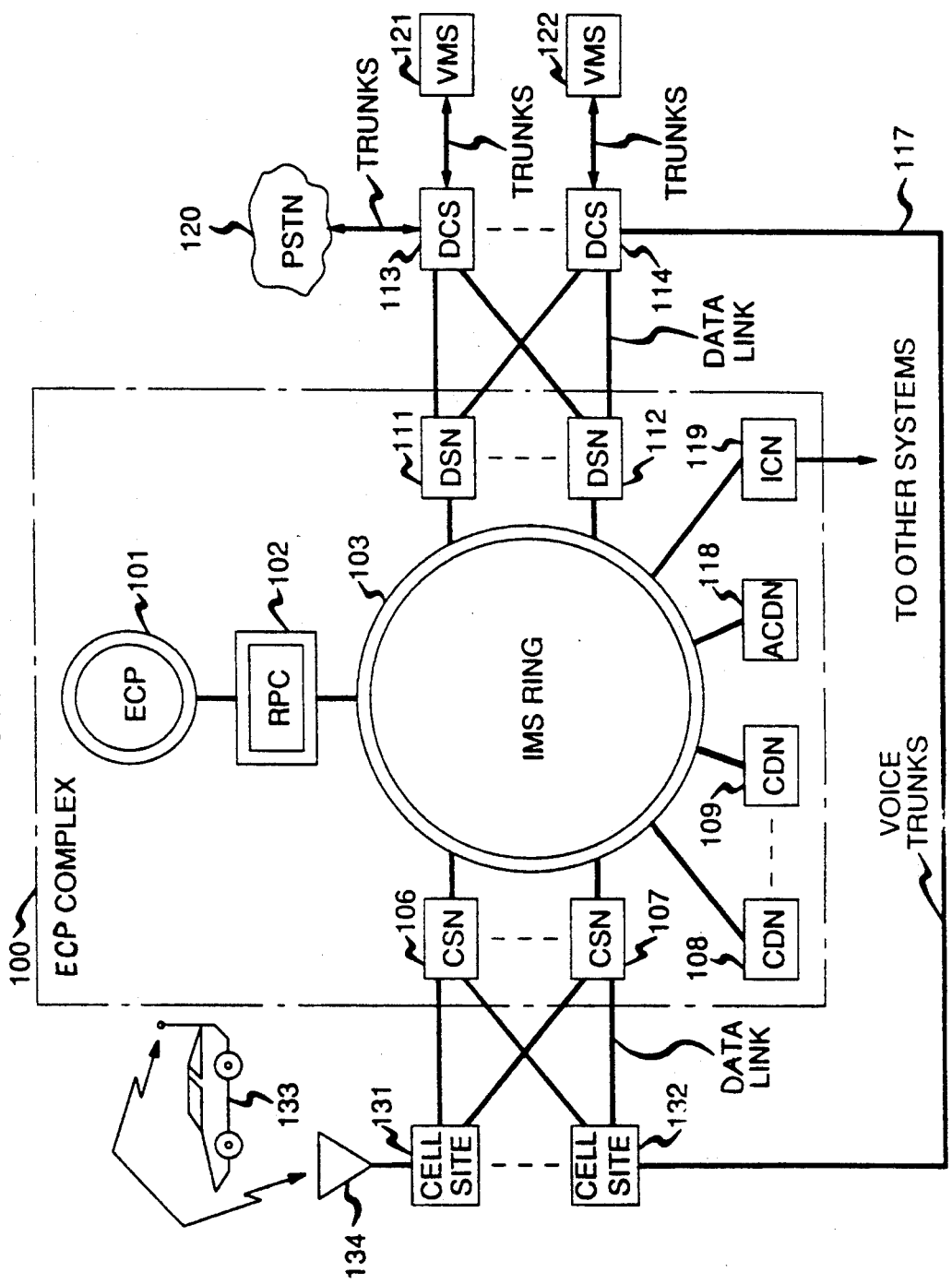
FIG. 1 is a schematic of a cellular mobile telephone architecture.

A typical cellular mobile telephone system is shown schematically in FIG. 1. The overall system includes a message processing system 100 which is controlled by a central cellular processor 101 (ECP) which controls operation of a cellular telephone system. In the system disclosed herein this ECP 101 is connected via a ring peripheral controller node (RPC) 102 to an interprocessor message switch (IMS) 103. The IMS 103 is a token ring in which messages from any processor connected to the ring can be transmitted to any other processor connected to the ring. RPC 102 is a ring node which provides an interface between the ECP 101 and the IMS ring 103. Token rings and its associated interface technology are well known in the art and it is not believed necessary to disclose its details herein.

Included within the message processing system and connected to the processing ring are a plurality of cell site nodes 106, 107 (CSN), a plurality of call processing/database nodes 108, 109 (CDN) and a plurality of digital switch nodes 111, 112 (DSN). The DSNs 111, 112 are link nodes to interconnect the IMS ring 103 to the digital cellular switches 113, 114 (DCS). The DCSs 113, 114 are connected in turn, via a trunk line, to the public switched telephone network 120 (PSTN) which is the land telephone network that provides public telephone service. Each of the DCSs 113, 114 may be connected to a voice mail system 121, 122(VMS). Each VMS 121, 122 is essentially a computer system attached, via a trunk, to the telephone switching system 120, via the DCS 113 and 114. A VMS functions as a central answering machine for telephone subscribers. Each subscriber who has subscribed to this answering service is assigned a "mailbox" on the disk of the VMS into which messages are entered by callers when the called subscriber does not answer. These messages may be retrieved by the subscriber at a subsequent time. Since voice message system equipment and operation are well known by those skilled in the art it is not believed necessary to disclose them in detail.

A plurality of cell sites 131, 132 for communicating with mobile radiotelephones within a cell are shown interconnected to the IMS ring via the CSNs 106, 107. These cell site nodes 106,107 are link nodes which provide an interface between the IMS ring and the cell sites 131, 132. The cell itself is a geographical area, idealistically often depicted as a hexagon shaped area, which is served by cell site equipment to provide mobile radiotelephone service. Use of the cell designation and its technical ramifications are well known in the art and it is not believed necessary to disclose the cell and its equipment in detail.

Each cell includes a cell site 131, 132 which is an installation within the cell including the equipment necessary to set up and complete calls between the cell site and mobile radiotelephones 133. The equipment includes transmitting and receiving antennas shown illustratively by the antenna 134 shown transmitting and receiving signals to and from the mobile radiotelephone 133.

DCS 114 is shown connected, via one voice trunk connection 117 to each cell site 131,132. This connection facilitates delivery of stored voice mail from the VMS systems 121, 122 to the cell site equipment at the cell sites 131, 132.

An administrative call processing/database node 118 (ACDN) is connected to the IMS ring 103 and is operative for assigning calls to the CDNs 108, 109 for processing. An intersystem cellular node 119 (ICN) is provided as a link node to provide communications protocol between different cellular telephone systems.

The foregoing cellular system is illustrative of cellular telephone systems to which the principles of the invention may be applied. It is not intended to be limiting of cellular systems to which the principles of the invention may be applied.

Figure 2:
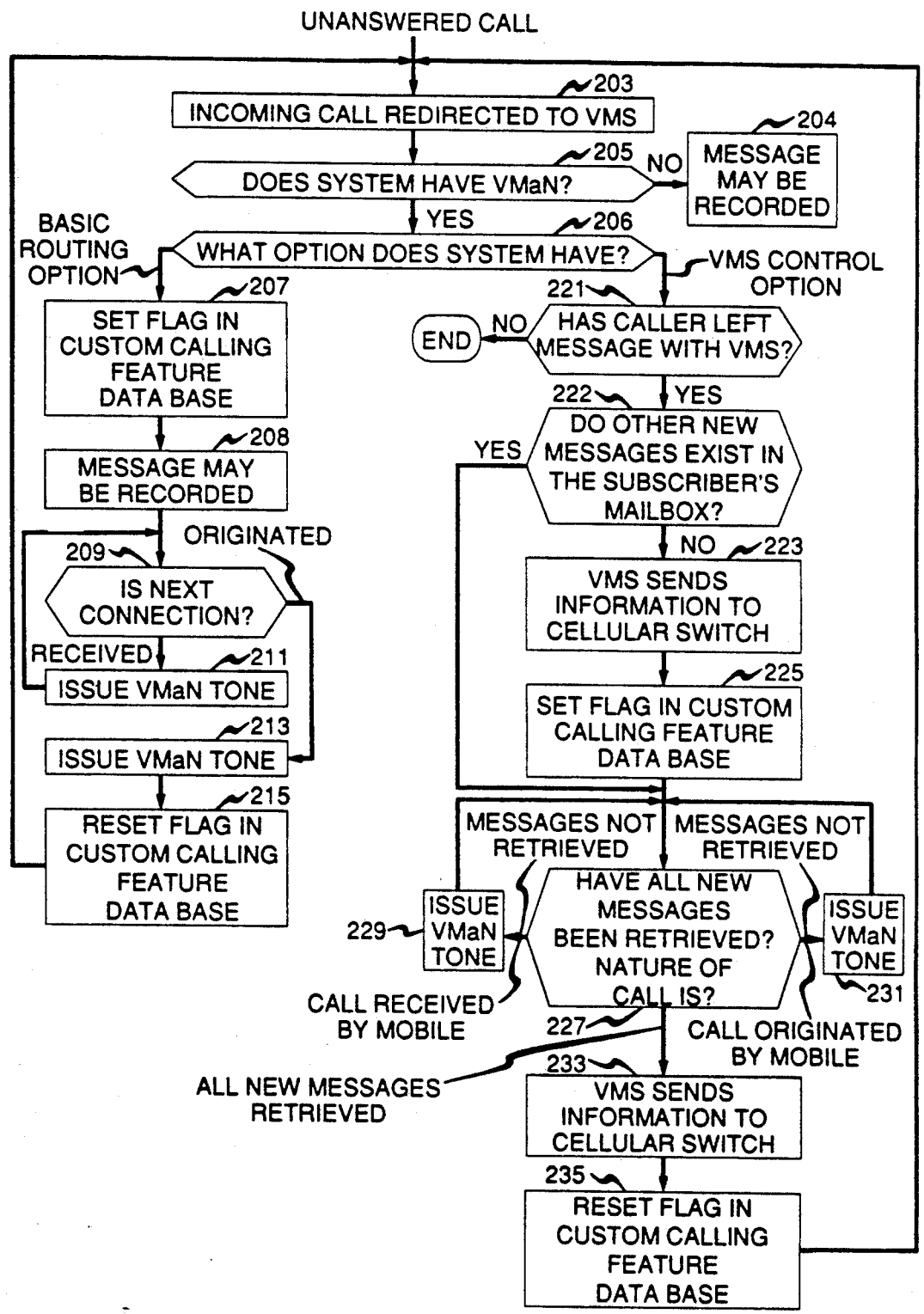
FIG. 2 is a flowchart of operation of the voice mail notification system according to the invention.

A flowchart of the system operations in implementing the voice mail notification system is shown in FIG. 2. The process begins when a called party, having voice message recording service, does not answer an incoming call. The incoming call is directed, by the instructions of the block 203, to a voice message system (VMS) 121, 122 in FIG. 1 which is operative to record the caller's message. A decision inquiry is made by a stored program control in block 205 to determine if the called party's system has voice mail notification service. If the called party's system does not have voice mail notification (VMaN) service, the message can be recorded in the voice mail system as per block 204 and no further action is taken. Here the message will remain until the called party decides to access the voice message system to inquire if messages have been deposited for him/her.

If the mobile subscriber's system has VMaN service the instructions of decision block 205 direct the process flow to a decision block 206 with instructions to determine if the system serving the subscriber has the basic routing option or the VMS control option. The option is determined by the cellular service provider and is common to all subscribers in that system. With the basic routing option, one audible notification is provided to the mobile subscriber through the speaker of the mobile radiotelephone handset. This one audible notification is provided when the subscriber subsequently receives a call or originates a call, signifying that one or more incoming calls have been transferred to the voice message system (VMS) 121, 122. Notification on received calls continues until and upon the first mobile originated call. With the alternative VMS control option, notification of existing voice messages is given upon all orginations and terminations until all the new messages have been retrieved by the mobile subscriber.

If the subscriber's system utilizes the basic routing option, process flow proceeds to the block 207 with instructions to set a flag in the cellular switch custom calling feature data base associated with the DCS 113, 114 to indicate the redirection of the call to the VMS. After the flag is set the caller may leave a voice message as indicated by the instructions of block 208. Failure to leave a voice message does not affect the setting of this flag. The nature of the next subscriber call connection as either received or originated is determined in decision block 209. If the connection is a received mobile termination connection, e.g., a call directed to the mobile subscriber, the process flow proceeds to the block 211 whose instructions cause the issuance of a VMaN tone to notify the subscriber that a call was redirected to the VMS. Process flow returns to the input of block 209 so that repeat notification may be given upon occurrence of the next call.

If the call is initiated or originated by the mobile subscriber the process flow proceeds to block 213 whose instructions cause the issuance of a VMaN tone to notify the subscriber that a call was redirected to the VMS. Process flow proceeds to block 215 which resets the flag in the data base. Process flow then returns to the beginning of the announcement notification process.

Where the subscriber's system has the VMS control option as determined by decision block 206 the process flow continues to a decision block 221 whose instructions determine if the caller has left a message with the VMS. The caller may choose to leave a voice message. If none is left, no further action is taken. Otherwise, if no other unread messages exist in the voice mailbox the flow process proceeds according to the instructions of decision block 222 to the instructions of block 223. If previous unread voice messages exist in the subscriber's mailbox the flow process proceeds directly to the input of the block 227. If a new voice message has been entered and there are no existing voice messages in a subscriber's mailbox, the VMS sends information to the cellular mobile switch center associated with DCS 113, 114, as per the instructions of block 223, and according to the instructions of the block 225 a flag indicating the existence of the recorded voice message is set in the data base of the cellular switch.

The process flow proceeds to the decision block 227 to determine if a subsequent call is originated by or terminated to the mobile radiotelephone unit and if all new voice messages have been retrieved by the mobile subscriber. If the call terminates at the mobile unit and all new messages have not been retrieved the instructions of block 229 cause a VMaN tone to be issued, via the speaker of the mobile radiotelephone handset, and the process flow returns to the input of block 227. Likewise if the call is originated by the mobile unit the instructions of block 231 cause the VMaN tone to be issued. Since all new messages have not been retrieved the flow returns to the input of block 227.

Upon retrieval of all new stored voice messages, information indicating this event is sent to the cellular switch in accord with the instructions of the block 233. The flag in the switch custom calling feature data base signifying the existence of a voice message is reset according to the instructions of the block 235 and the process flow returns to the beginning of the announcement notification process.

Following herein is a list of acronyms and technical terms as used in the preceeding portion of the specification and their respective definitions.

ACDN:

Administrative Call Processing/Database Node—A CDN that has responsibility for assigning new calls to CDNs for processing.

Basic routing option:

A mode of VMaN which is the alternative to the VMS control option. As incoming calls to a mobile subscriber are redirected to a VMS, the VMaN flag is set. It is cleared upon the first outgoing call placed by the subscriber from their mobile unit.

ccf: custom calling feature

A feature which is usually subscriber changeable, i.e., the subscriber has the ability to turn the feature on and off with a dial tone combination.

ccfdb: custom calling feature data base

Repository of custom calling feature data, stored on a per subscriber basis, for custom calling features which are usually subscriber changeable.

CDN:

Call Processing/Database Node—A type of link node in a cellular switch which is responsible for call processing activity. It is normally a digital computer.

CSN:

Cell Site Node—Link node which provides the interface between the Cell Site and the IMS ring.

DCS: digital cellular switch

Digital Cellular Switch—A switch with custom hardware and software used as a telephone switch within the cellular systems.

DN:

Directory Number—A mobile subscriber's unique 10-digit mobile phone number.

DSN:

Digital Switch Node—Link node which provides the interface between the Digital Cellular Switch and the IMS ring.

ECP:

Executive Cellular Processor—A computer which is the main processor for the cellular system.

ICN:

Intersystem Cellular Node—A link node which provides communications protocol between two cellular switching systems.

IMS ring:

Interprocessor Message Switch ring—A token ring: It carries Messages from the one processor to any other processor on the system.

MRS: message recording service

Message Recording Service—A custom calling feature allowing callers and subscribers to access a centralized answering machine for the MSC, thus allowing deposit and retrieval of messages.

MSC:

Mobile Switching Center—All of the control and switching elements of a cellular system. In a typical cellular system the MSC consists of the ECP, IMS ring and DCS. (The MSC is also sometimes called the MTSO.)

PSTN: public switched telephone network

Public Switched Telephone Network—The network that provides public telephone service.

RPC:

Ring Peripheral Controller (node)—Ring node which provides the interface between the ECP and the IMS token ring.

VMaN flag:

A bit set in the ccf data base, on a per mobile subscriber basis, to indicate whether there is new voice mail in the subscriber's mailbox (VMS control option), or when a call has been redirected to the mobile subscriber's mailbox (basic routing option).

VMaN tone:

An audible tone issued to a mobile subscriber, upon originating a call and/or a call terminating to the mobile, when new voice mail is present in the subscriber's mailbox (VMS control option), or when a call has been redirected to the mobile subscriber's mailbox (basic routing option).

VMaN: Voice Mail Notification

An optional feature which provides an audible tone to a mobile subscriber when a new voice mail message has been deposited in their voice mail box (VMS control option), or when a call has been redirected to the mobile subscriber's mailbox (basic routing option).

VMS control option:

A mode of VMaN which is controlled by communications between the VMS and the the cellular switch. As new voice mail messages are deposited and subsequently retrieved from a mobile subscriber's voice mail box, the VMS signals pertinent information to the cellular switch, which in turn controls the VMaN flag. This option is the alternative to the Basic Routing Option.

VMS: voice mail system

A computer system attached to a telephone switching system, which functions as a central answering machine for telephone subscribers. Each subscriber is assigned a "mailbox", into which messages are deposited by callers, until they are retrieved by the subscriber.

We claim:

1. A method of notifying users of mobile radiotelephones in a cellular telephone system of existing voice mail addressed to them,
    comprising the steps of:
    storing an incoming message in a message recording medium;
    initiating a notification process in response to the incoming message by setting a flag in a data base describing the features that the user has subscribed to;
    responding to the set flag upon the occurrence of a subsequent call involving the user's mobile radiotelephone to issue an audible notification of a voice message existing in a voice mail box of the user.

2. A method of notifying users of mobile radiotelephones in a cellular telephone system of existing voice mail addressed to them as claimed in claim 1,
    comprising the steps of:
    resetting the flag when the user originates a call.

3. A method of notifying users of mobile radiotelephones in a cellular telephone system of existing voice mail addressed to them as claimed in claim 1,
    comprising the steps of:
    resetting the flag when all new stored voice messages are retrieved by the mobile subscriber.

4. A method of providing an audible notification to the user of a mobile radiotelephone in a cellular telephone system to alert the user of at least one existing voice message in a message recording system;
    comprising the steps of:
    responding to a receipt of voice mail in a voice mailbox system by generating a notification that is addressed to the user of a mobile radiotelephone by determining if the mobile radiotelephone subscriber is subscribed to a voice mail notification system;
    upon determination of a subscriber subscription to voice mail notification service determining if a caller has left a message on the voice message service recording medium;
    upon determination of a recorded voice message setting a flag in a data base dedicated to defining subscriber features that are subscribed to;
    issuing an audible voice mail notification tone upon the next use of the mobile radiotelephone; and
    resetting the flag when the voice mail message has been retrieved.

5. A method of providing an audible notification as claimed in claim 4,
    further comprising the steps of:
    re-issuing the audible voice mail notification at each use of the mobile radiotelephone until all new voice mail messages have been retrieved.

6. A method of providing an audible notification as claimed in claim 4,
    further comprising the steps of:
    repeating the audible voice mail notification with each call terminated at the mobile radiotelephone until the first call origination of the mobile radiotelephone.

7. A method of providing an audible notification to the user of a mobile radiotelephone in a cellular telephone system as claimed in claim 4, comprising the further steps of:

determining if the mobile radiotelephone subscriber is subscribed to a basic routing option of a voice mail notification system;

upon determination of a subscriber subscription to a basic routing option of a voice mail notification service determining if an incoming call was redirected to a message recording system;

upon determination of a redirected call to a message recording system, setting a flag in a data base dedicated to defining subscriber features that are subscriber to;

issuing an audible voice mail notification tone upon the next use of the mobile radiotelephone; and resetting the flag at an origination of a call from the mobile radiotelephone.

* * * * *